United States Patent [19]

Melle et al.

[11] Patent Number: 5,319,435
[45] Date of Patent: Jun. 7, 1994

[54] METHOD AND APPARATUS FOR MEASURING THE WAVELENGTH OF SPECTRALLY NARROW OPTICAL SIGNALS

[76] Inventors: Serge M. Melle, 87 Oakwood, Toronto, Ontario, Canada, M6H 2V9; Kexing Liu, 360 Ridelle Avenue, Apt. 810, Toronto, Ontario, Canada, M6B 1K1; Raymond M. Measures, 16 Flowervale Road, Thornhill, Ontario, Canada, L3T 4S4

[21] Appl. No.: 754,641
[22] Filed: Sep. 4, 1991
[51] Int. Cl.⁵ .............................. G01B 11/16
[52] U.S. Cl. ...................... 356/32; 250/227.18
[58] Field of Search ............ 356/32, 45, 419; 250/227.18, 226; 372/20, 92, 102

[56] References Cited

U.S. PATENT DOCUMENTS

| | | |
|---|---|---|
| 2,941,444 | 6/1960 | Frykman .................... 356/51 |
| 4,081,215 | 3/1978 | Penny et al. ................ 356/45 |
| 4,278,349 | 7/1981 | Sander ........................ 356/45 |
| 4,308,456 | 12/1981 | Van Der Gaag et al. ... 250/226 |
| 4,326,798 | 4/1982 | Kahn .......................... 356/45 |
| 4,451,730 | 5/1984 | Brogardh et al. .......... 356/32 |
| 4,761,073 | 8/1988 | Meltz et al. ................ 356/32 |
| 4,955,028 | 9/1990 | Alferness et al. .......... 372/102 |
| 4,983,035 | 1/1991 | Wright et al. .............. 356/32 |

Primary Examiner—Richard A. Rosenberger

[57] ABSTRACT

A method and apparatus for measuring the wavelength of spectrally narrow optical signals, particularly from guidedwave structures, is taught, which utilizes a known wavelength dependent transfer function and determining from the resulting signal the wavelength. In a preferred embodiment the spectrally narrow optical signal is divided into at least two signals, followed by optically processing the signals to produce a wavelength dependent change between the signals and determining the wavelength therefrom.

16 Claims, 10 Drawing Sheets

Wavelength Dependent Ratiometric Bragg Laser Sensor

METHOD AND APPARATUS FOR MEASURING THE WAVELENGTH OF SPECTRALLY NARROW OPTICAL SIGNALS

FIELD OF THE INVENTION

The present invention relates to a method and an arrangement for measuring the wavelength of optical signals particularly optical signals from guidedwave structures. This method and apparatus has particular application with respect to lasers, optical communication networks, and sensors based on Bragg Gratings, Raman or Brillouin Scattering.

BACKGROUND OF THE INVENTION

Fiber optic Bragg gratings have been used for absolute strain and temperature sensing, cure monitoring, and have the potential for use as magnetic or electric field sensors. This requires the accurate tracking of narrow band wavelength shifts on the order of several nanometres. It has been proposed to use a tunable, narrow band light source, such as a DFB or DBR laser, to track the wavelength shifts. In this embodiment, timed signals of known wavelengths are used to interrogate the sensor. The shift in wavelength of the Bragg Grating is determined from the timing of a back-reflected signal.

Another approach has been the use of broadband source and a tunable detection system, such as achieved by use of a scanning monochrometer or a tunable acousto-optic filter which would scan the wavelength range of interest and determine the wavelength of the back-reflected signal. A further approach uses a spectrometer and a photodiode array.

Each of the above methods have limited time response and have not permitted such wavelength shifting sensors as Bragg gratings to have wide application or compete with conventional strain gauges. The practical use of optical guidedwave sensors, such as fibre optic sensors, in smart materials and structures, places severe requirements on the characteristics of any sensing system. The need to compete with, or even surpass in performance conventional sensors such as resistive foil or piezoelectric strain gauges or temperature sensors, amongst others, requires a system that provides high resolution, high speed sensing, and absolute sensing. Also of importance are low cost for large scale use and small size and ruggedness in order to service in potentially demanding aerospace environments. Of particular importance is the new field of "smart materials and structures", where fibre optic Bragg grating sensors would be embedded within composite material structures for various sensing applications such as; strain and temperature measurements, cure monitoring, load history tracking, acoustic emission detection and damage assessment.

The present invention satisfies a number of these requirements.

SUMMARY OF THE INVENTION

A method for measuring the wavelength of a narrow band optical signal from an optical guidedwave structure, according to the present invention comprises dividing the signal into at least two signals, processing the signals to produce a wavelength-dependent change between the two signals, and comparing the two processed signals to determine the wavelength.

The present invention is also directed to an apparatus for measuring the wavelength of a narrow band optical signal from an optical guidedwave structure. This wavelength dependent apparatus comprises means for dividing the signal into at least two signals, means for processing the signal to produce a wavelength-dependent change between the two signals, and determining from the processed signals the wavelength.

BRIEF DESCRIPTION OF THE DRAWINGS

Preferred embodiments of the invention are shown in the drawings, wherein.

DETAILED DESCRIPTION OF THE PREFERRED EMBODIMENTS

The invention will be specifically described with respect to fiber optic Bragg gratings which are already known to be useful for measuring absolute strain, temperatures, cure monitoring, and possible other applications including magnetic and electric field sensing. The invention does have application to any known optical sensor wherein the wavelength of a narrowband optical signal is measurand dependent.

The term narrow band optical signal is determined relative to the broad band wavelength dependent transfer function of the processing system.

It was first shown by K. O. Hill et al that reflective gratings could be photorefractively formed in the core of germanium doped silicate fibers. The interference pattern caused by counter propagating beams of 488 nm argon laser light created permanent localized changes in the refractive index of the core. This caused a Bragg type grating to be produced in the core of the optical fiber due to the periodic variation of refractive index. The periodicity of these gratings is equal to the periodicity of the interference pattern and the resulting change in refractive index.

Light travelling down the core of an optical fiber with such a Bragg grating will be scattered by the regions of changed refractive index. The scattered light will generally be out of phase and will tend to cancel, except when the wavelength of the incoming radiation satisfies the Bragg condition. In this case, the light reflected by each perturbation in the grating adds constructively, leading to the formation of a back-reflected peak whose center wavelength $\lambda_B$ is given by $$\lambda_B = 2 n_c \Lambda \quad (1)$$

where $n_c$ is the refractive index of the core of the fiber and $\Lambda$ is the grating periodicity. Similar gratings were subsequently produced by Meltz et al using a transverse holographic method with 245 nm Uv light. It has been shown that these gratings are permanent at temperatures up to 500° C., and can be used as strain or temperature sensors.

Figure 1:
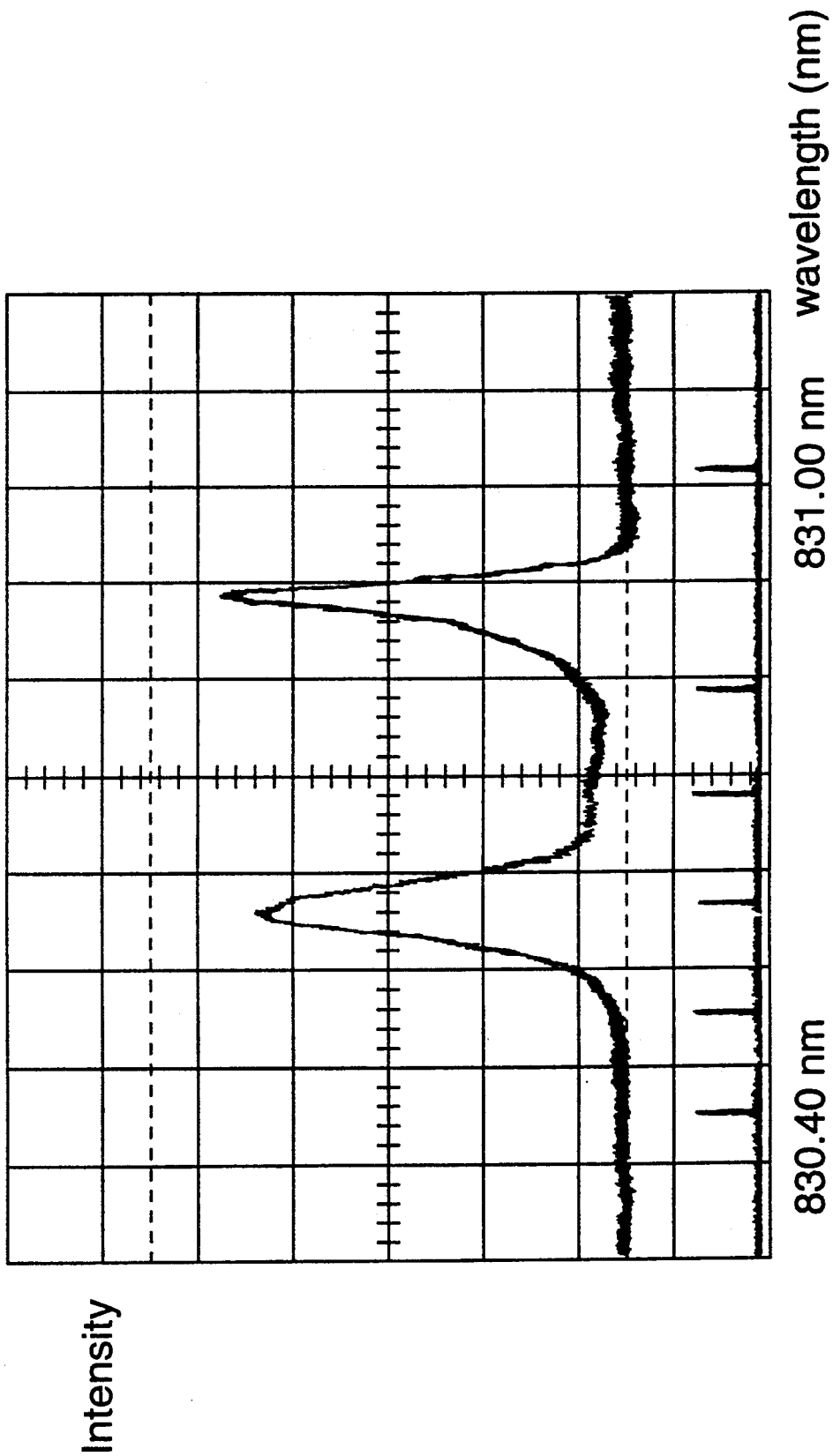
FIG. 1 is the spectrum of a back-reflected optical signal from an in-fiber Bragg grating, the two peaks correspond to the two polarization eigenmodes of the optical fiber.

The optical back-reflected spectrum of a Bragg grating fabricated in Andrew E-type fiber, manufactured by United Technologies, is shown in FIG. 1. Since this is hi-birefringent fiber, each polarization axis will have its own back-reflected wavelength peak due to the slightly different index of refraction for each axis. The fast axis has a center wavelength of 830.59 nm and 0.06 nm bandwidth, and the slow axis has a center wavelength of 830.88 nm and 0.04 nm bandwidth. The difference between the center wavelengths for the fast and slow axis was experimentally measured to be 0.288 nm. This compares to the theoretically calculated value of 0.228 nm, obtained from the value given for the birefringence of Andrew E-type fiber. The difference may be due to changes in the normalized birefringence caused by the transverse holographic writing method used for producing Bragg gratings.

When a Bragg grating is axially strained, the Bragg wavelength shifts because the grating spacing changes and because of a photoelastic induced change in the refractive index. The strain sensitivity is given by $$\Delta\lambda_B/\lambda_B = (1 - p_e)\epsilon \quad (2)$$

where $\epsilon$ is the axial strain applied to the grating and $p_e$ is the effective photoelastic constant and is equal to 0.22 for germanosilcate glass. The strain sensitivity of Bragg gratings was measured and is discussed in the experimental results section below.

Temperature sensing can also be done by measuring the shift in the Bragg wavelength caused by a change in the grating spacing due to thermal expansion and the refractive index dependence on temperature. The temperature sensitivity is given by $$\Delta\lambda_B/\lambda_B = (\alpha + \xi)\Delta T \quad (3)$$

where $\alpha$ is the coefficient of thermal expansion for the fiber, which is $0.55 \times 10^{-6}$ silica, and $\xi$ is the thermooptic coefficient and is equal to $8.3 \times 10^{-6}$ for germanium doped silica.

CALIBRATION OF BRAGG GRATING SENSOR

Figure 2:
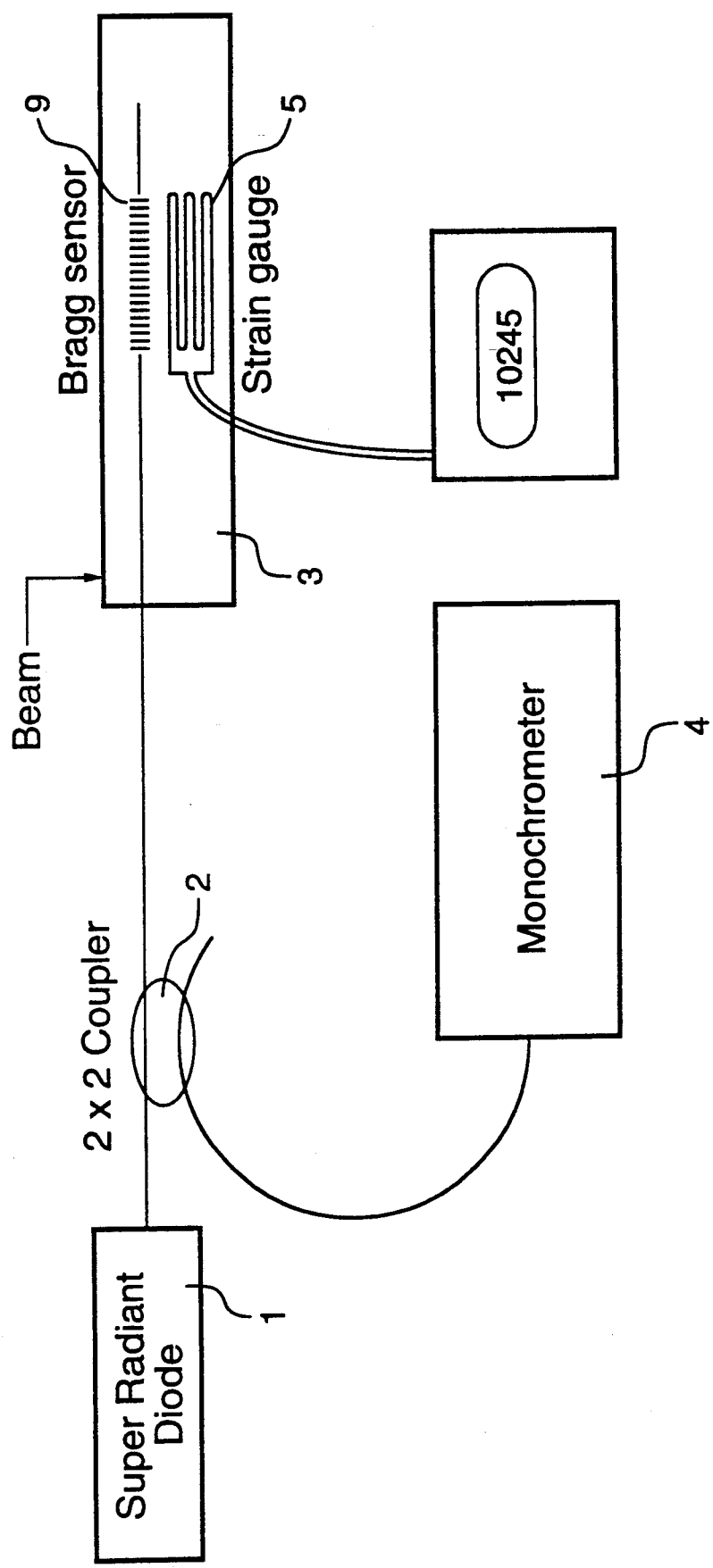
FIG. 2 is a schematic of a conventional measuring arrangement for use with a Bragg grating sensor.
Figure 3:
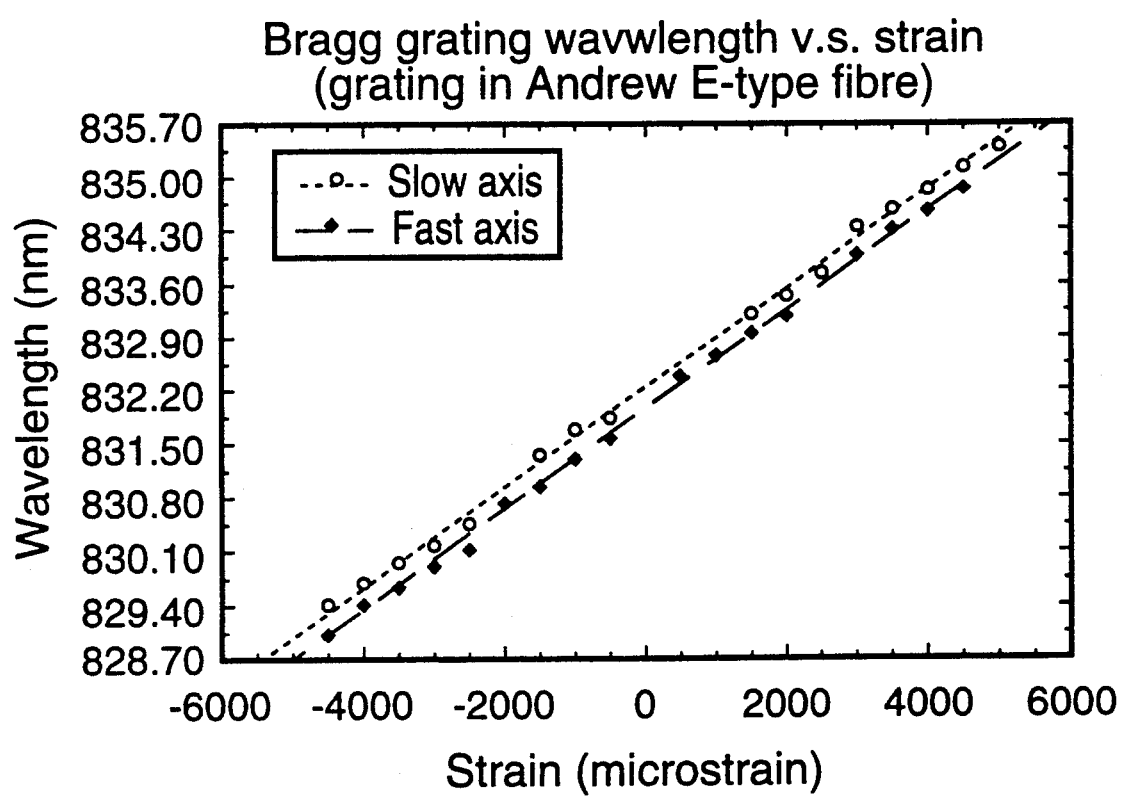
FIG. 3 is a plot of Bragg wavelength versus strain foreach of the two polarization states for the arrangement of FIG. 2.

The strain sensitivity of an in-fiber Bragg grating of length 1.5 cm formed in Andrew E-type elliptical core fiber was measured. A super radiant diode (SRD) 1, an SRD-8301 made by Laser Diode, was used as a broadband optical signal source, and was coupled to the Bragg grating 3 through a 2×2 coupler 2. The back-reflected Bragg spectrum was then coupled to a grating monochromatic 4 through the same coupler 2. The system configuration is shown in FIG. 2. The monochrometer used was a 1 meter SPEX Model 1700 Spectrometer. The wavelength dependence of the Bragg peak for the fast and slow axis as a function of strain on the fiber is shown in FIG. 3. The experimentally measured wavelength shifts are shown as data points plotted over the theoretically calculated values shown by lines. The experimental data shows strong correlation with theory, and the strain sensitivity of the Bragg gratings was found to be 0.648 pm/$\mu\epsilon$ for the fast axis and 0.644 pm/$\mu\epsilon$ for the slow axis. At some strain values either the fast or slow axis Bragg peak was missing. This is due to strain induced birefringence when both eigen polarization modes are excited.

WAVELENGTH DEPENDENT RATIOMETRIC DETECTION SYSTEM FOR BRAGG GRATING SENSORS

The measurement technique of the preferred embodiment for evaluating the wavelength of narrow band optical signals from a guidedwave structure can also be used to track measurand induced wavelength shifts of the optical signal using a wavelength dependent ratiometric filtering technique. This detection system was used to measure the wavelength shifts of the narrow-band back-reflected peak of a fiber optic Bragg grating illuminated by a broadband source. Strain induced changes in the Bragg grating's center wavelength were tracked using the wavelength dependent ratiometric detection system.

The arrangement shown in FIG. 2 and the results of FIG. 3 indicate the state of the art.

Figure 4:
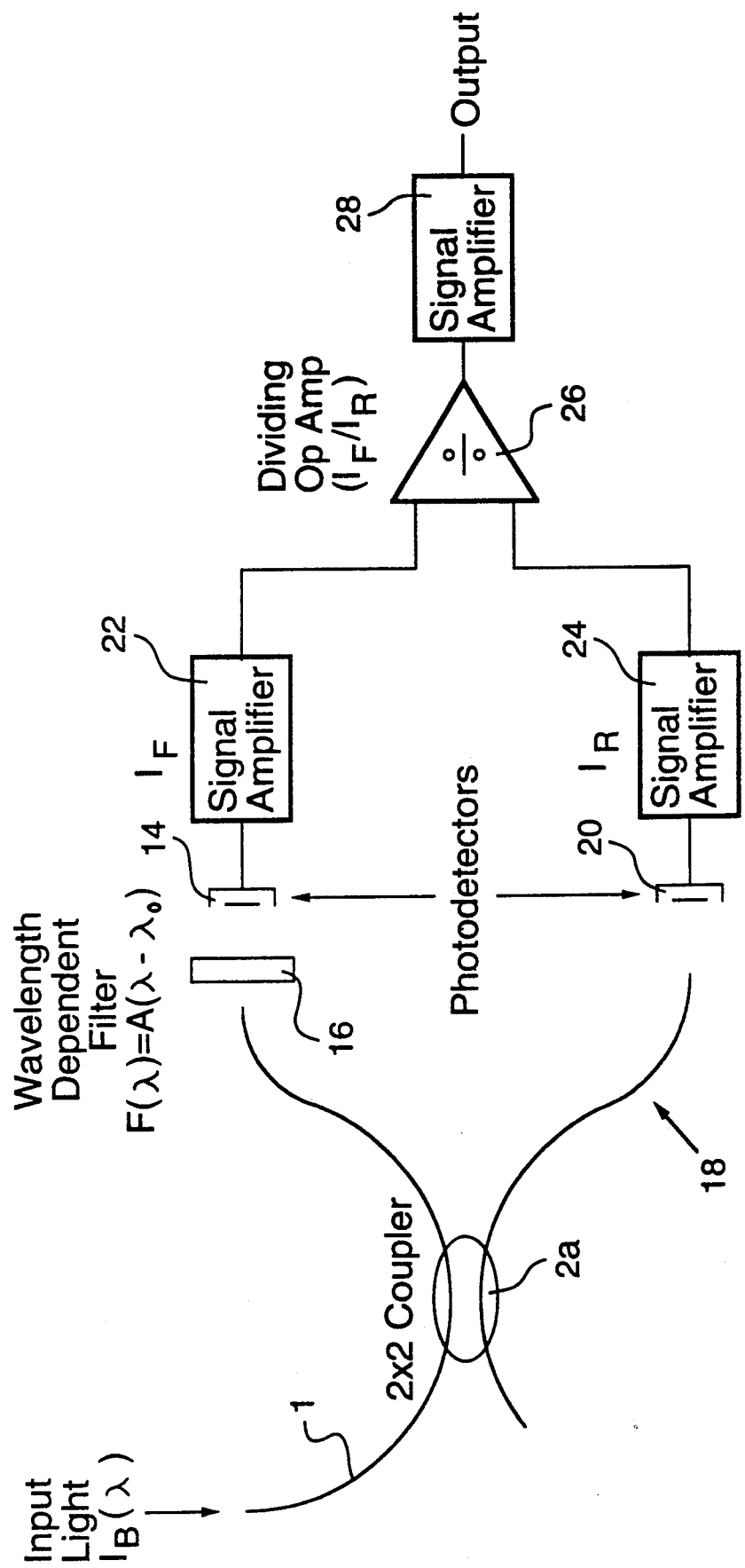
FIG. 4 is a schematic of the wavelength dependent ratiometric arrangement of the present invention.

The preferred embodiment of the invention is shown in FIG. 4. The back-reflected narrow-band optical signal from an intracore in fiber Bragg grating is directed into the detection system through an optical fiber 1, and split by a 2×2 coupler 2 with a 50/50 coupling ratio. This coupling ratio has negligible wavelength dependence over the wavelength range of interest. The optical signal transmitted to one arm of the coupler is filtered by filter 16 before being detected by a photodetector 14. The filter 16 used has a wavelength dependent filtering function which is preferably linear over the wavelength range that corresponds to the dynamic range of the system. The optical signal transmitted through the other coupler arm 18 is not filtered, and is directly detected by a similar photodetector 20. This optical signal serves as a reference for the filtered optical signal. The output from each photodetector is amplified at 22 and 24 before being fed to an analog divider 26, and the system output is then amplified at 28.

The percentage of the incident optical signal passed through the wavelength dependent filter 16 is directly dependent on the wavelength of that optical signal. If we model the narrow band back-reflected Bragg peak as a Gaussian function of spectral width $\Delta\lambda$, and center wavelength $\lambda_B$, the intensity of the back-reflected Bragg peak as a function of wavelength can be described as $$I_B(\lambda) = I_o e^{-(\frac{\lambda - \lambda_B}{\Delta\lambda})^2} \quad (4)$$

The linearized model of the filter function $F(\lambda)$ can be expressed as $$F(\lambda) = A(\lambda - \lambda_o) \quad (5)$$

where A is the filtering slope and $F(\lambda)$ is equal to zero at $\lambda_o$. The intensity of the filtered optical signal and reference optical signal can thus be written as $$I_F = \int_0^\infty I_B(\lambda) F(\lambda) d\lambda \quad (6)$$

$$I_R = \int_0^\infty I_B(\lambda) d\lambda \quad (7)$$

Thus the output from the filtered arm and reference arms can be expressed as $$I_F = I_o A \frac{\sqrt{\pi}}{2} \left( \lambda_B - \lambda_o + \frac{\Delta\lambda}{\sqrt{\pi}} \right) \Delta\lambda \quad (8)$$

$$I_R = I_o \frac{\sqrt{\pi}}{2} \Delta\lambda \quad (9)$$

The output detected from the reference arm 18 remains constant as the input wavelength changes. The ratio of the filtered to reference outputs can thus be expressed as $$\frac{I_F}{I_R} = A \left( \lambda_B - \lambda_o + \frac{\Delta\lambda}{\sqrt{\pi}} \right) \quad (10)$$

and will vary as the input wavelength $\lambda_B$ shifts. If the bandwidth of the Bragg grating and the filter function are known, the wavelength of the input optical signal is then directly proportional to the ratio of the filtered to unfiltered outputs. Fluctuations and variations of the source intensity, connector alignment and coupling losses will not affect the output of the ratiometric detection system, as the system is self-referencing. Amongst the types of filters that can be used in such a system are; coloured glass bandpass filters, narrow band or edge interference filters, dichromic filters, tapered optical fibres or guided wave Bragg gratings. This wavelength dependent function produced a wavelength dependent change uniquely particularized by the wavelength of the back-reflected signal from the Bragg grating.

TEST SYSTEM AND RESULTS

A wavelength dependent ratiometric detection system was built for use with the back-reflected narrow-band optical signal from a fiber optic Bragg grating. A super radiant diode was used as a broadband source for a Bragg grating fabricated in Andrew E-type fiber. The lead-in and lead-out fibers used in the system were not polarization maintaining, so the optical signal input to the ratiometric system did not consist of one narrow-band spectral peak, but was rather the sum of the grating's two individual polarization peaks. The center wavelength of the input optical signal was therefore the weighted average of these two peaks.

Figure 5:
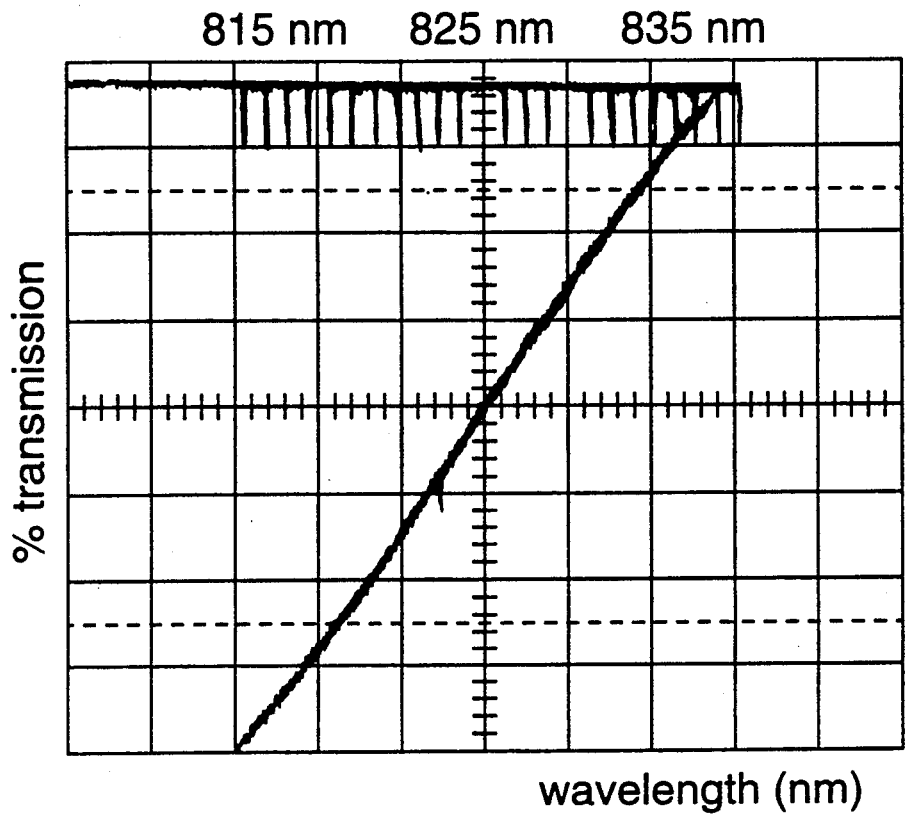
FIG. 5 is a graph of the transmission function of the wavelength dependent filter used in the present invention.

A commercially available RG830 infrared high pass filter was used in the wavelength dependent ratiometric detection system. The filter's transmittance as a function of wavelength is shown in FIG. 5. The filter function is linear from 815 nm to 838 nm, with 50% transmittance at 828 nm. For a Bragg grating with a strain sensitivity of 0.65 pm/$\mu\epsilon$, the linear filtering range corresponds to dynamic strain range of approximately 35,000 $\mu\epsilon$.

The linear range of the filter's broad band wavelength dependent transmission function is approximately 300 times the spectral width of the narrow band optical signal.

The Bragg sensor 4 was surface bonded to a Lexan beam 3 with strain gauge glue and was used to measure beam deflection. A resistive foil strain gauge 5 was mounted beside the Bragg sensor to serve as a strain reference, as generally shown in FIG. 2, but where the monochrometer was replaced with the signal processing arrangement of FIG. 4. The photodetector outputs from the filtered and reference arms of the output coupler were amplified and then fed to an analog dividing circuit which provides an output that can be fed to an oscilloscope for display. A real time ratio of filtered to unfiltered optical signal, which is directly proportional to the strain on the sensor is thus provided by the system. Although two photodetectors were used, one could use a bicell detector to reduce possible variations between each dectector.

Figure 6:
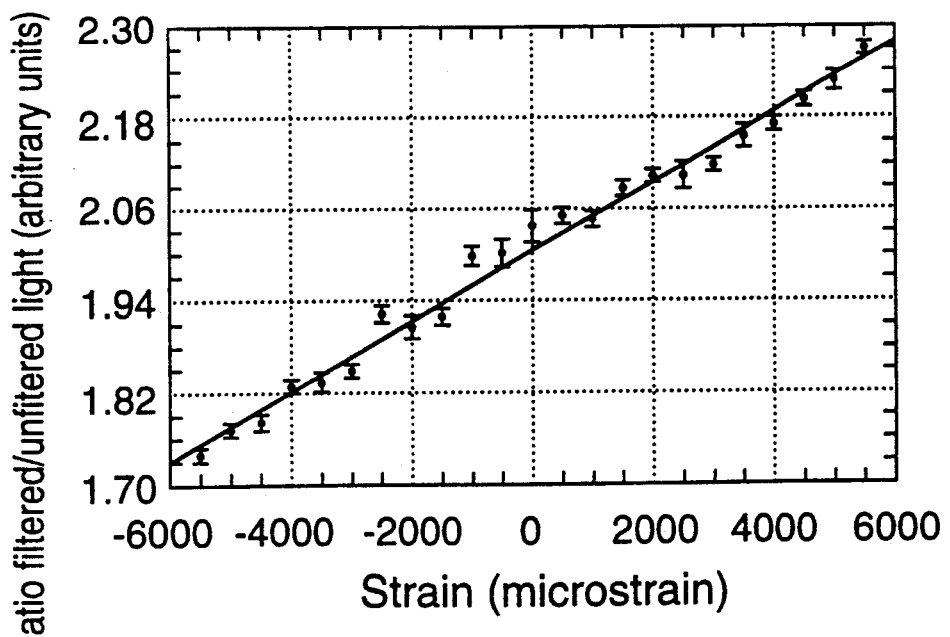
FIG. 6 is a plot of the static strain sensitivity of the wavelength dependent ratiometric detection system.

The wavelength dependent ratiometric detection system was used to track wavelength shifts in the Bragg sensor as the beam was statically strained. The ratio of filtered to unfiltered optical signal was measured as a function of static strain from $-5500\mu\epsilon$ to $+5500\mu\epsilon$, as shown in FIG. 6. The system's measured strain resolution was $375\mu\epsilon$, corresponding to a wavelength resolution of 1% over the 18 nm dynamic range of the filter. This strain resolution was primarily limited by the relatively high noise levels in detection electronics.

Figure 7:
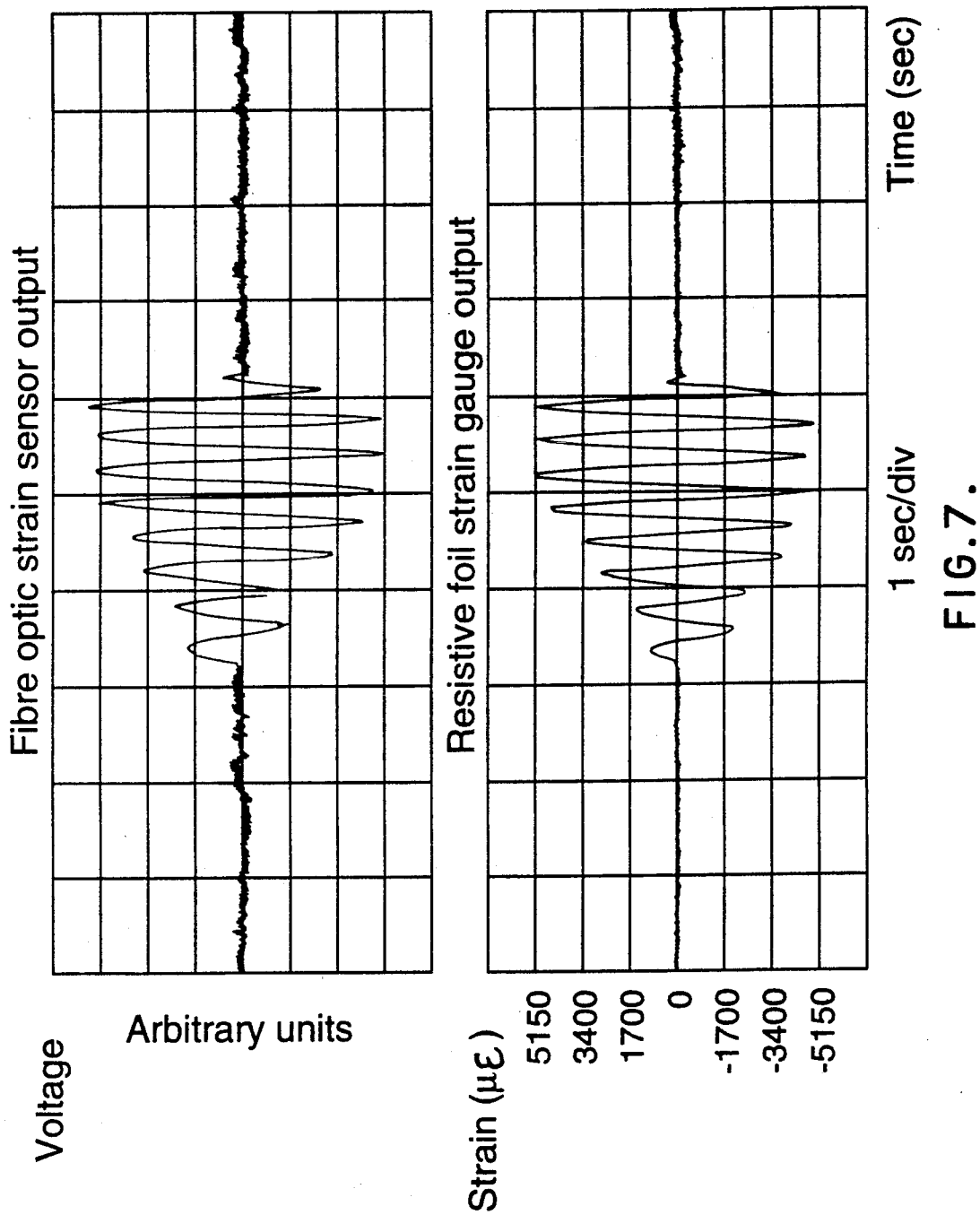
FIG. 7 is a comparison of the temporal outputs from the fiber optic Bragg grating strain sensor and the resistive foil strain gauge.

The wavelength dependent ratiometric detection system was also used to track the wavelength shifts of the Bragg sensor as the beam was dynamically strained. The wavelength dependent ratiometric detection system output is shown in the top half of FIG. 7, while the strain measured using a conventional resistive foil strain gauge is shown in the lower half as a reference. Dynamic strains up to approximately 3Hz have been measured, but speed has been limited by the trans-impedance amplifiers used to amplify the photodetector outputs. Improved high speed electronics will allow measured and tracking limited only by the speed of the signal processing electronics. The system built has shown the principle of operation of a passive ratiometric detection system for the measurement of both static and dynamic strain induced wavelength shifts in a Bragg grating sensor.

The strain resolution of the experimental system described above was limited by several factors and can be greatly improved. The speed of the system is inherently limited by the speed of the processing electronics, the power of the back-reflected optical signal, and the physical response time of the sensor with respect to the physical property being measured. The sensitivity of the system in tracking narrow-band spectral features can be improved through refinements in the filtering components of the system.

The slope of the filter function determines the sensitivity of the wavelength dependent ratiometric detection system. Since the slope of the RG830 filter is 2.29% increase in transmission per nanometre, the transmittance only increases from 21% to 65% over the filter's linear range. The use of narrow-band interference filters or edge filters would increase resolution, as these filters have a filtering slope on the order of 17%/nm. Either the positive or negative slope of these filters can be used. However, any increase in sensitivity would lead to a corresponding decrease in the dynamic range.

If the output is divided in two and use made of two filters with opposite filtering slopes, one for each output, the sensitivity would effectively be double that attained with a single filter. In this case the outputs from the two filters can be written as $$I_{F1} = I_o A \frac{\sqrt{\pi}}{2} \left( \lambda_B - \lambda_{o1} + \frac{\Delta\lambda}{\sqrt{\pi}} \right) \Delta\lambda \quad (11)$$

$$I_{F2} = I_o B \frac{\sqrt{\pi}}{2} \left( \lambda_B - \lambda_{o2} + \frac{\Delta\lambda}{\sqrt{\pi}} \right) \Delta\lambda \quad (12)$$

where A and B are the slopes of the two filters. The ratio of the two outputs will then be $$\frac{I_{F1}}{I_{F2}} = -\frac{A}{B} \frac{\left( \lambda_B - \lambda_{o1} + \frac{\Delta\lambda}{\sqrt{\pi}} \right)}{\left( \lambda_B - \lambda_{o2} + \frac{\Delta\lambda}{\sqrt{\pi}} \right)} \quad (13)$$

and if the two filter functions and the Bragg grating sensor bandwidth are known, the wavelength dependent ratiometric system output will be proportional to the wavelength of the input optical signal.

Figure 8:
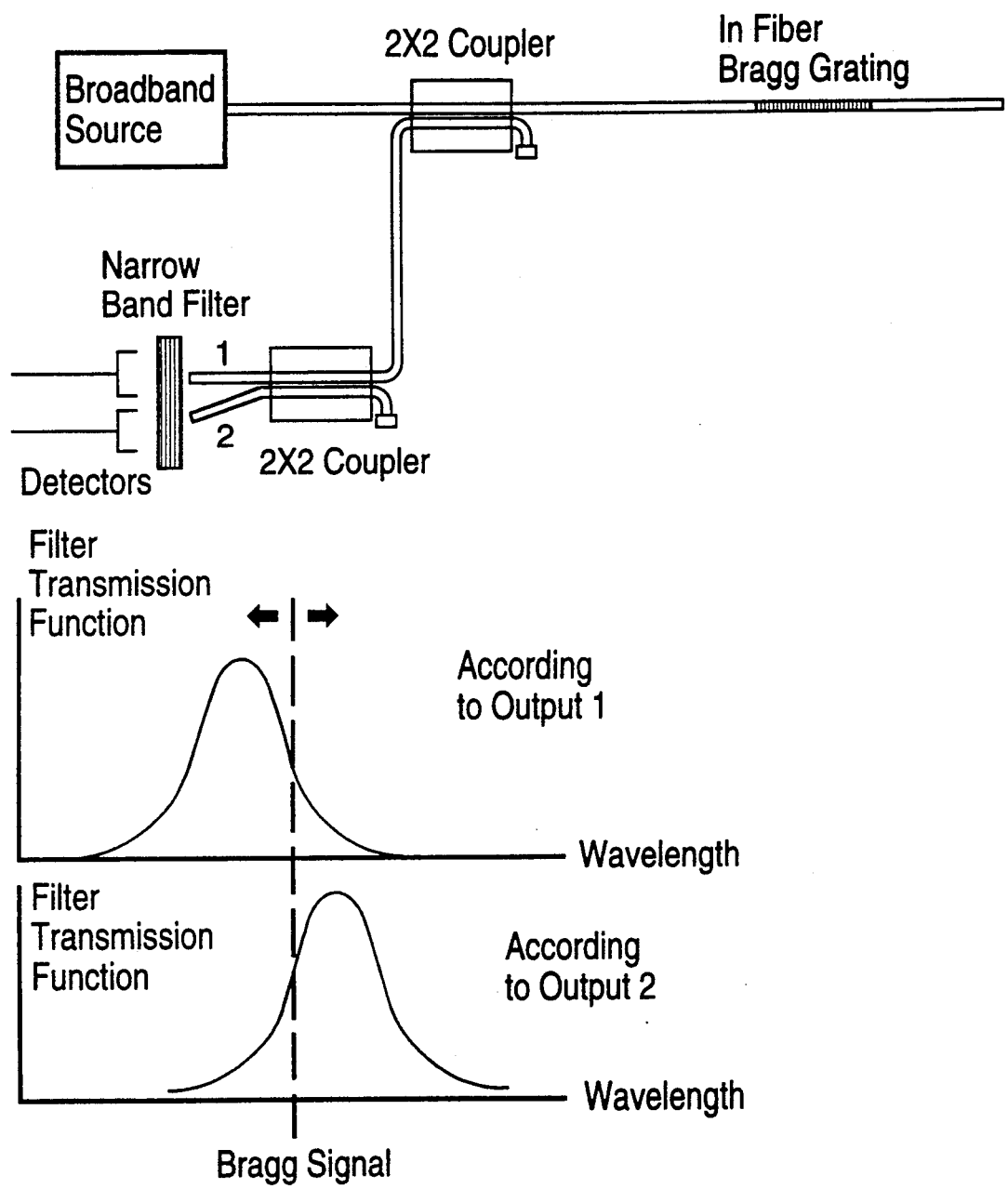
FIG. 8 is a schematic of a Bragg grating sensor arrangement for measuring the Bragg wavelength using the opposite slopes of a single narrow band interference filter and in the lower part of the figure a schematic of the filter transmission function as seen for the two outputs.

Since the centre wavelength of the spectral transmission function of a narrow band interference filter is dependent on the incident angle of optical signal it is possible to attain this dual filtering action using only one filter. In this case the two output optical beams pass through the narrow band filter at different angles as shown in FIG. 8. The angles would be adjusted so that one beam is filtered by the positive slope of the filter and the other beam by the negative slope. Each beam will then be incident upon a separate detector. This simplification has the advantage of eliminating filter variations that might arise when using two filters.

The use of a Bragg grating fabricated in polarization maintaining fiber will avoid polarization induced wavelength fluctuations and requires the use of an all hi-birefringent fiber optic system. The back-reflected Bragg peaks corresponding to each polarization axis can then be isolated, and each optical signal can be directed independently into separate wavelength dependent ratiometric systems. Such an arrangement may also permit the separation of strain and temperature when used with suitable optical fibers. This would address the problem of apparent strain which arises due to the thermal sensitivity of the optical fiber and different thermal expansion properties of the optical fiber and the host material.

Figure 9:
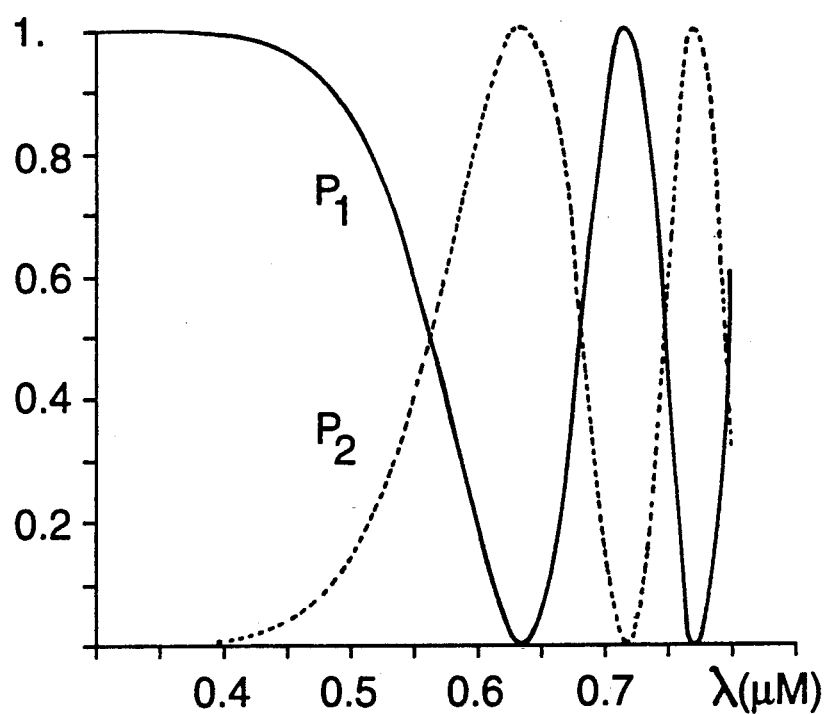
FIG. 9 shows the coupling ratio dependency on wavelength of an optical direction coupler.

The wavelength dependent ratiometric detection system can be further simplified through the replacement of the beam-splitting coupler and the output filter(s) by a highly wavelength dependent over-coupled coupler. This coupler would split the input back-reflected Bragg spectrum for transmission to the photodetectors, but since the coupling ratio has a strong dependence on wavelength, see FIG. 9, the ratio of the two outputs would be directly determined by the wavelength of the input optical signal. By adjusting the coupling ratio's dependence on wavelength to the dynamic wavelength range to be measured, the wavelength dependent ratiometric detection system can be customized for a variety of specifications. These couplers can be manufactured in either fiber optic, integrated optic or eventually in thin film form. The wavelength sensitivity of such a coupler is shown in FIG. 9, based on work done by Parriaux et al. Bilodeau and Hill also reported on the fabrication of highly overcoupled fiber optic fused couplers.

Figure 10:
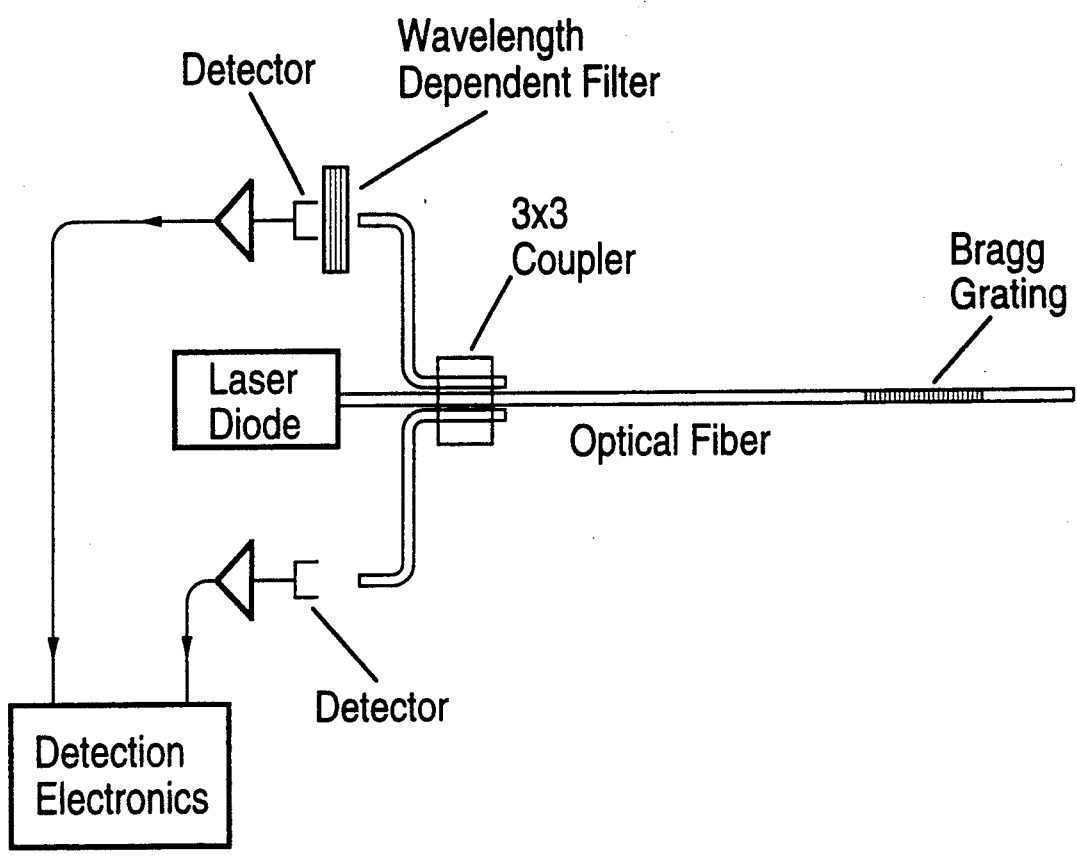
FIG. 10 is a schematic of a Bragg grating sensor arrangement using a 3×3 optical coupler.

In FIG. 10 a 3×3 coupler is used to reduce the number of couplers in the system. A modification of this arrangement would use a 3×3 highly wavelength dependent over-coupled optical coupler to perform all three functions: split off a fraction of the return optical signal, divide this into two signals the ratio of which would depend upon the wavelength of the input signal. With such a modification, the filter in FIG. 10 is eliminated.

Figure 11:
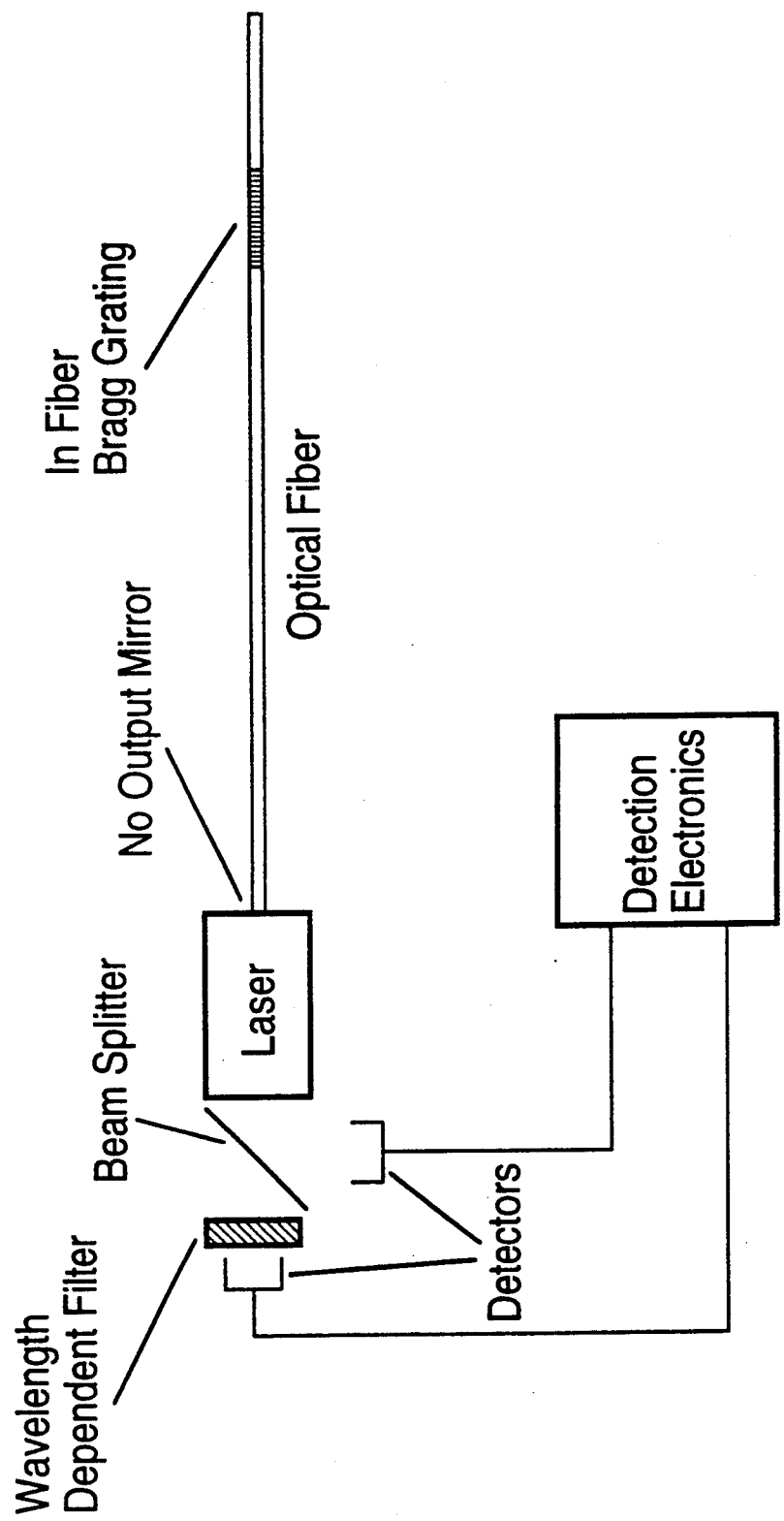
FIG. 11 is a schematic of a wavelength dependent ratiometric Bragg laser sensor arrangement.

Another possibly even more useful embodiment of this wavelength dependent ratiometric principle involves the use of a laser in which a Bragg grating formed in a guidedwave structure forms one of the cavity mirrors of the laser. In this arrangement, the laser operates at the Bragg grating wavelength and since this depends on the strain and temperature of the grating surroundings, the laser wavelength will track these variables. If a wavelength dependent ratiometric detection apparatus is used to monitor the laser wavelength a very small, fast response, compact laser sensor result. One possible arrangement is shown in FIG. 11. This "wavelength dependent ratiometric Bragg laser sensor" arrangement could be made small enough with integrated optics to embed the entire system within a composite structure with a simpler connection.

The wavelength dependent ratiometric detection system described herein demonstrates the initial performance obtained from a new passive detection system for use with fiber optic Bragg grating sensors. The system developed provides a compact, rugged, potentially low-cost and high-speed wavelength detection method that would allow the use of Bragg sensors in smart materials and structures, as well as allowing the development of a fiber optic strain or temperature gauge for a wide range of engineering applications. Both static and dynamic absolute strain measurements have been demonstrated, and temperature measurements are equally possible. Improved sensitivity of the system will be attained through the use of dual filters of opposite filtering slopes, or the opposite slopes of one filter. Steeper filtering slopes will allow acoustic wave sensing. The wavelength dependent ratiometric detection principle as applied for use with Bragg grating sensors can also be used for the measurement of the wavelength of a Bragg grating tuned laser diode, as well as being adaptable for use in the measurement of Raman or Brillouin back-scattered radiation.

This wavelength dependent ratiometric detection principle can also advantageously be used with other optical sensors which use wavelength or its change to determine a measurand, or with other optical systems where the wavelength of an optical signal needs to be quickly assessed or a wavelength shift evaluated. Examples would be: tunable lasers or ones where the wavelength might drift over time; and optical communication systems in which the wavelength might be varied.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A method for evaluating strain or temperature conditions of a material in field operational conditions, said method comprising:

operatively associating a guidewave sensor having a Bragg grating as a sensing element with the material to be evaluated such that changes in the conditions of the material after the characteristics of the Bragg grating:

producing a spectrally broad optical signal and directing said signal to said Bragg grating to thereby produce a spectrally narrow optical back-reflected signal from said Bragg grating indicative of the conditions of said material;

dividing said spectrally narrow optical back-reflected signal into at least two signals; and optically processing said two signals by means of a known function of wavelength to produce a wavelength dependent change between the two signals uniquely particularized by the wavelength of the back-reflected signal and comparing the processed signals to determine the wavelength of the back-reflected signal from which the strain or temperature conditions of the material are evaluated, wherein the step of optically processing varies the intensity of at least one of the signals and said step of comparing the signals compares the ratio of the intensities of the two optical signals from which the wavelength is determined, and wherein said steps of dividing the optical signal and processing said optical signal are simultaneously carried out by means of a single coupler.

2. An apparatus for determining the wavelength of a spectrally narrow optical signal from a guidedwave structure, comprising:

means for dividing the optical signal into at least two signals;

means for processing the optical signals to produce a wavelength dependent change between the two signals and determining therefrom the wavelength, including a 3×3 optical direction coupler for the purpose of splitting a portion of the back-reflected optical signal and forms said means for dividing the signal, and wherein said 3×3 optical coupler is highly over-coupled so that the coupling ratio is wavelength dependent, and wherein said coupler forms said means for processing.

3. An apparatus for evaluating strain or temperature conditions of a material under field conditions, said apparatus comprising:

a guidedwave sensor having a Bragg grating as a sensing element operatively associated with the material to be evaluated such that changes in the conditions of the material alter the characteristics of the Bragg grating;

means for producing a spectrally broad optical signal and directing said signal to said Bragg grating and thereby producing a spectrally narrow optical backreflected signal from said Bragg grating indicative of the conditions of said material;

an arrangement for dividing said spectrally narrow optical back-reflected signal into at least two signals; and a processing arrangement which optically processes said two signals by means of a known function of wavelength to produce a wavelength dependent change between the two signals uniquely particularized by the wavelength of the back-reflected signal and comparing the processed signals to determine the wavelength of the back-reflected signal from which the strain or temperature conditions of the material are evaluated.

wherein said means for processing determines the wavelength from the ratio of intensities of the two signals, and wherein said means for processing and said means for dividing are combined in a highly over-coupled direction coupler in which the coupling ratio varies with wavelength.

4. In combination a laser sensor and an apparatus for measuring the lasing wavelength of said laser sensor, said laser sensor having a guidedwave sensing Bragg Grating as one of the cavity mirrors; said apparatus comprising a means for dividing the laser output into two signals, means for processing the two signals to produce a wavelength dependent variation in the ratio of the two signals from which the lasing wavelength can be determined.

5. An apparatus as claimed in claim 4 wherein the guidedwave sensing Bragg Grating is embedded within a material to be sensed.

6. An apparatus as claimed in claim 4 wherein the guidedwave sensing Bragg Grating and the laser and the wavelength dependent ratiometric detection system is embedded within a material to be sensed.

7. A system for evaluating temperature or strain comprising a laser having a lasing cavity and being capable of producing a narrowband output logical lasing signal within a broad wavelength band, a Bragg grating as a combination cavity mirror of said lasing cavity and as a temperature or strain sensing element, a guidewave structure forming at least part of said lasing cavity of said laser terminated at one end of said guidedwave structure by said Bragg grating, said Bragg grating being formed as part of said guidedwave structure and only reflecting a spectrally narrow wavelength signal which wavelength is dependent upon the condition of the Bragg grating such that the lasing output signal is a spectrally narrow lasing signal from which the condition of the Bragg grating can be determined, and processing means which receives and evaluates the spectrally narrow lasing output signal by dividing the lasing signal into two signals and spectrally processing the signals to produce a wavelength dependent change between the two signals and evaluating the ratio of intensities of the two signals from which the temperature or strain of the body under investigation can be determined while automatically reducing the effect of variations in the intensity of the lasing output signal.

8. A system as claimed in claim 7 wherein said guidedwave structure is an optical fiber and said Bragg grating is an in fiber Bragg grating.

9. A system as claimed in claim 7 wherein said processing means, after dividing the spectrally narrow lasing output signal into two signals, spectrally processes only one of the signals to produce a known wavelength dependent change, whereafter the signals are evaluated to measure the strain or temperature using the ratio of intensities of the signals.

10. A system as claimed in claim 7 wherein each of said two signals are processed to produce different wavelength dependent changes and then said two processed signals are evaluated using the ratio of intensities to measure the temperature or strain.

11. A system as claimed in claim 7 wherein said processing means is positioned to directly receive the lasing output signal from the end of said laser opposite said Bragg grating.

12. A system as claimed in claim 7 wherein said guidedwave structure is an optical fiber having a core and said Bragg grating is formed in the core of the optical fiber.

13. A system for evaluating temperature or strain comprising
- a laser having a lasing cavity and being capable of producing a narrowband output optical lasing signal within a broad wavelength band,
- a Bragg grating as a combination cavity mirror of said lasing cavity and as a temperature or strain sensing element,
- a guidedwaves structure forming at least part of said lasing cavity of said laser terminated at one end of said guidedwave structure by said Bragg grating, said Bragg grating being formed as part of said guidedwave structure and only reflecting a spectrally narrow wavelength signal which wavelength is dependent upon the condition of the Bragg grating such that the lasing output signal is a spectrally narrow lasing signal from which the condition of the Bragg grating can be determined, and
- processing means which evaluates the spectrally narrow lasing output signal to determine the temperature or strain of the body under investigation.

14. A system as claimed in claim 13 wherein said guidedwave structure is an optical fiber and said Bragg grating is an in fiber Bragg grating.

15. A system as claimed in claim 13 wherein said processing means is positioned to directly receive the lasing output signal from the end of said laser opposite said Bragg grating.

16. A system as claimed in claim 13 wherein said guidedwave structure is an optical fiber having a core and said Bragg grating is formed in the core of the optical fiber.

* * * * *